United States Patent [19]
Reber

[11] Patent Number: 5,492,632
[45] Date of Patent: Feb. 20, 1996

[54] METHOD AND SYSTEM FOR MONITORING AND CONTROLLING A FILTRATION PROCESS

[75] Inventor: William L. Reber, Schaumburg, Ill.

[73] Assignee: Motorola, Inc., Schaumburg, Ill.

[21] Appl. No.: 311,305

[22] Filed: Sep. 23, 1994

[51] Int. Cl.⁶ .................................................. B01D 33/80
[52] U.S. Cl. ........................... 210/739; 210/87; 210/96.1; 210/196; 210/400; 210/780; 210/805
[58] Field of Search .................................... 364/401, 406; 210/85, 87, 96.1, 97, 143, 400, 401, 739, 742, 770, 194, 196, 780, 783, 805

[56] References Cited

U.S. PATENT DOCUMENTS

| | | | |
|---|---|---|---|
| 4,160,734 | 7/1979 | Taylor et al. | 210/96.1 |
| 4,612,123 | 9/1986 | Eustacchio et al. | 210/96.1 |
| 4,830,757 | 5/1989 | Lynch et al. | 210/96.1 |
| 5,021,166 | 6/1991 | Torpey | 210/96.1 |
| 5,128,860 | 7/1992 | Chapman | 364/401 |
| 5,256,288 | 10/1993 | Lee | 210/321.61 |
| 5,259,952 | 11/1993 | Lee | 210/137 |
| 5,268,300 | 12/1993 | Latura et al. | 210/96.1 |
| 5,292,438 | 3/1994 | Lee | 210/504 |

*Primary Examiner*—Joseph W. Drodge
*Attorney, Agent, or Firm*—Bruce E. Stuckman

[57] ABSTRACT

A method and apparatus for creating a filtration knowledge base is used in a filtration process for separating a liquid component and a solid component from a slurry. The concentrations of the solid component in the slurry, and of the solid component in the separated liquid, are monitored and stored in a knowledge base along with a quantity relating to the amount of filtering. The knowledge base can be used for controlling the slurry-producing process, routing the separated liquid, automated billing and automated compliance reporting.

24 Claims, 3 Drawing Sheets

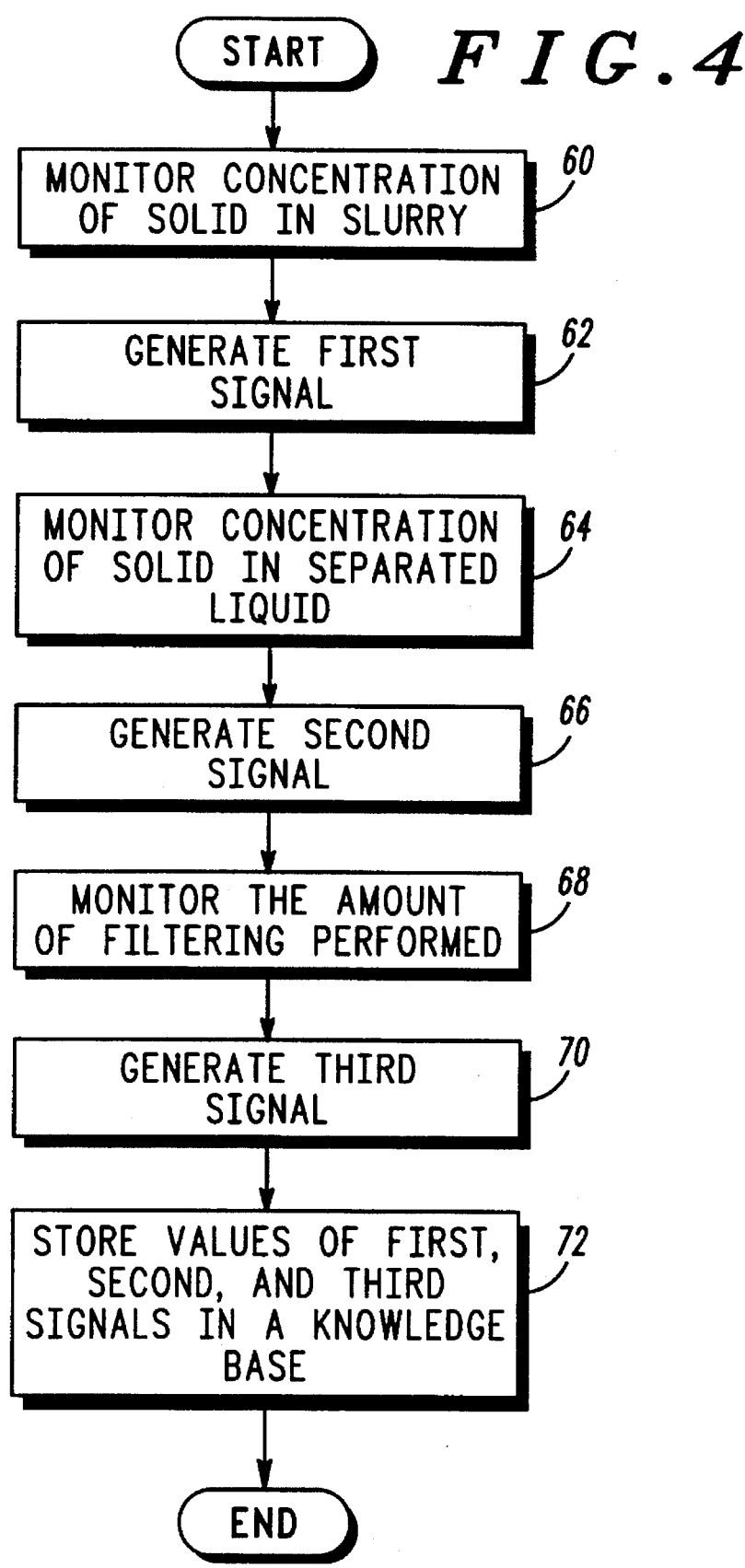

5,492,632

METHOD AND SYSTEM FOR MONITORING AND CONTROLLING A FILTRATION PROCESS

TECHNICAL FIELD

The present invention relates generally to filtration processes and, more specifically, to the treatment of liquid waste.

BACKGROUND OF THE INVENTION

Liquid waste treatment is a tremendous problem in industry. Most industrial processes create liquid waste in such forms as unwanted process byproducts and used or contaminated solvents or lubricants. An example of waste production, common to many industries, is the production of waste water. For example, salt water is a byproduct of many food canning processes. Waste water is also a byproduct of the production of paper, and of bleaching and dying processes used by the textile industry in the manufacture of garments. Waste water is also a component in sewage and food processing.

In many cases, the treatment of waste water involves the dilution of the water until the contaminants present in the water are at low enough levels to meet standards for disposal into a nearby stream or lake. This solution is not environmentally sound since the contaminants are introduced into the environment in potentially accumulating quantities. In addition, from an economic perspective, the tremendous amount of water required to dilute some contaminants may be cost prohibitive in some applications.

U.S. Pat. Nos. 5,292,438, 5,256,288 and 5,259,952, issued to Lee, and assigned to Cer-Wat, Inc. disclose a cross-flow filtration method and system for separating solid contaminants from liquids. By means of this method and system, waste fluids can be filtered and the contaminants removed. Both the contaminants and the waste fluids can then be reused or recycled.

While these prior art systems have many advantageous features, they lack an automated system for monitoring and controlling the filtration process provided by the present invention.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 shows a flowchart representation of an additional embodiment of the method of the present invention used in accordance with the system of FIG. 1;

DETAILED DESCRIPTION OF THE DRAWINGS

Figure 1:
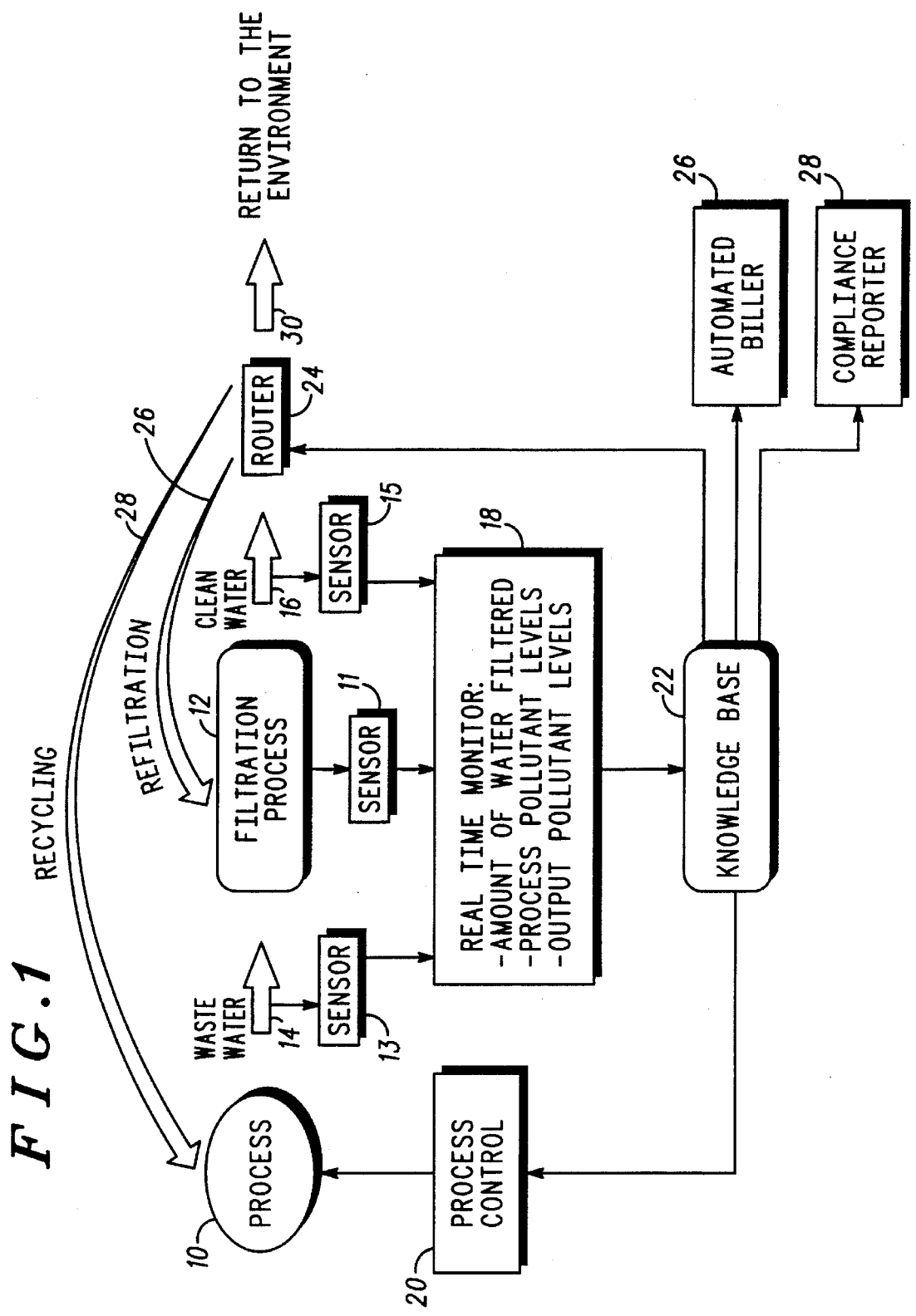
FIG. 1 shows a block diagram representation of one embodiment of the system of the present invention

FIG. 1 shows a block diagram representation of one embodiment of the system of the present invention. Process 10, e.g. an industrial process, produces waste water 14 as a byproduct. This waste water 14 is filtered by filtration process 12 to produce clean water 16 and solid contaminants 17. In a preferred embodiment of the present invention, the filtration process 12 is performed by the Cer-Wat method and system described in U.S. Pat. Nos. 5,292,438, 5,256,288 and 5,259,952.

The levels of contaminants in waste water 14 and clean water 16 are monitored by real time monitor 18 which uses sensor 15 in communication with clean water 16 and sensor 13 in communication with waste water 14. In one embodiment of the present invention, a photocell and photo emitter pair are used in each sensor to measure the level of solids based on the transmissivity of the water. However, one of ordinary skill in the art will recognize that other sensors could likewise be used in the present invention. A sensor 11, such as a flow meter or mass flow meter, is also provided to measure the amount of waste water which has been processed by filtration process 12. The data provided by these sensors is used to create a knowledge base 22.

Knowledge base 22, in a preferred embodiment, provides a time history of the filtration process 12 as well as the output of the process 10 from values of the sensor outputs at a plurality of discrete times.

In one embodiment of the present invention, the amount of waste water which has been filtered is reported to an automated billing process 26 which creates an appropriate billing record. The owners of process 10 are then billed for the amount of filtration used in a manner similar to billing for common utilities such as water, gas or electricity.

In a further embodiment of the present invention, knowledge base 22 also facilitates other monitoring and control processes. Data on the contaminant levels in the clean water 16 produced is reported to compliance reporter 28. This reporter 28 is capable of providing a complete record of governmental compliance over a period of time.

In an additional embodiment of the present invention, the amount of contaminants in waste water 14 is reported to process control 20. Process control 20 includes statistical process control (SPC) charting or other quality assurance systems and procedures to issue an alert if the contaminant levels in the waste water indicate that the process is out of "control". Process control 20 could also be provided with appropriate actuators to take the steps of either shutting down the process if the process is out of control or to control the process itself based upon this information.

In another embodiment of the present invention, the contaminant levels of clean water 16 are reported to router 24. In a preferred embodiment of the present invention, router 24 includes one or more electrically or pneumatically actuated values for directing the flow of clean water 16. If the contaminant levels meet governmental requirements, clean water 16 is returned to the environment via path 30. If the contaminant levels do not meet governmental requirements, clean water 16 is routed back to filter 12 via path 26 for further filtration. By means of repeated filtration (if necessary) and monitoring, 100% compliance with governmental standards can be assured.

Alternatively, if the contaminant levels of clean water 16 do not meet governmental standards, yet are sufficient for reuse, the clean water 16 is recycled and returned to the process 10 via path 28. This recycling of clean water 28 saves the cost of procuring additional water for process 10.

While the embodiment of FIG. 1 has been described in terms of the treatment of contaminants in waste water, one of ordinary skill in the art will recognize that the present invention could likewise be applied to the separation of any solid component and liquid component from a slurry. For the purposes of this discussion, a slurry includes any mixture or suspension of solid and liquid components which are separable by a filtration process, however course or fine. For example, solid contaminates can be filtered from used oil or other lubricants and bacteria can be filtered from liquids to be consumed, etc. Thus, solid components comprise any non-liquid impurities including living organisms such as microorganisms.

Figure 2:
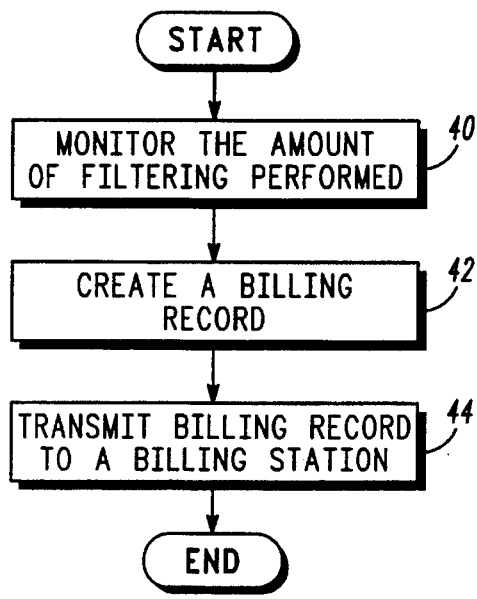
FIG. 2 shows a flowchart representation of one embodiment of the method of the present invention used in accordance with the system of FIG. 1.

FIG. 2 shows a flowchart representation of one embodiment of the method of the present invention used in accordance with the system of FIG. 1. The method provides automated billing to a filtration process that receives a slurry from a slurry-producing process and separates the solid component of the slurry and the liquid component of the slurry.

The method begins by monitoring the amount of filtering performed, as shown in step 40. In a preferred embodiment of the present invention, this amount is generated by monitoring at least one of: the flow of slurry into the filtration process using a flow meter, the flow of liquid component from the filtration process using a flow meter, and the accumulated amount of solid component separated from the filtration process (measured by weight).

The method continues by creating a billing record, as shown in step 42. This billing record contains information such as the amount of filtering performed, either in total or by the different time slots such as during peak and off-peak hours, the time and date, the name, address or other billing designation for the customer, a billing designation or billing code which identifies the bill itself, and pertinent rate information.

In one embodiment of the present invention, this billing record is held for retrieval at the billing site. In this case, the billing record is stored in a storage medium such as a tape drive, hard or floppy disk drive, or in a computer memory.

In an alternative embodiment of the present invention, the billing record is transmitted over a communication link, such as a radio frequency (RF) or telephone link to a remote billing station, as shown in step 44. The remote billing station then performs the functions of preparing a bill for the customer, based on the received billing record.

Figure 3:
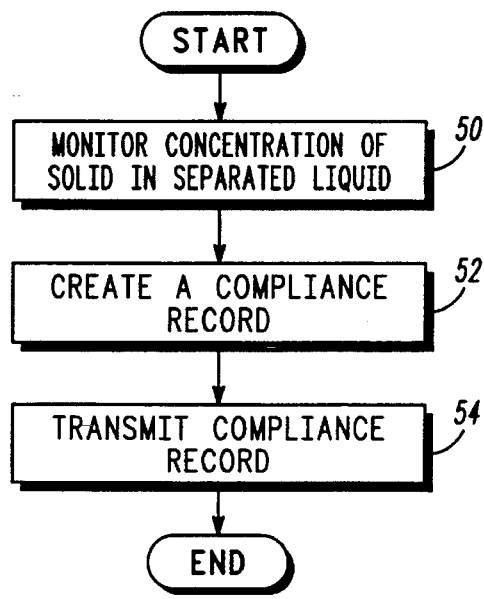
FIG. 3 shows a flowchart representation of a further embodiment of the method of the present invention used in accordance with the system of FIG. 1.

FIG. 3 shows a flowchart representation of a further embodiment of the method of the present invention in accordance with the system of FIG. 1. The method begins by monitoring a concentration of the solid component in the separated liquid component using a sensor to create a first signal, as shown in step 50. In a preferred embodiment of the present invention, the monitoring is performed repeatedly over time to provide a plurality of values of the first signal in a time sequence.

A compliance record is created by comparing a value of the first signal to a compliance value as shown in step 52. This compliance record includes periods of compliance or non-compliance with one or more compliance values such as governmental or industry specific target values. In one embodiment of the present invention, this compliance record is stored in a storage device for later retrieval. In an alternative embodiment of the present invention, the compliance record is transmitted to a central compliance station via an RF or telephonic link.

FIG. 4 shows a flowchart representation of an additional embodiment of the method of the present invention in accordance with the system of FIG. 1. The method forms a filtration data base from data collected from a filtration process. The method begins by monitoring a concentration of the solid component in a slurry using a first sensor, as shown in step 60. A first signal is generated based on the output of the first sensor, as shown in step 62.

The concentration of the solid component in the separated liquid component is monitored using a second sensor, as shown in step 64, and a second signal based on the output of the second sensor is generated, as shown in step 66. Further, a quantity relating to the amount of filtering performed is monitored using a third sensor, as shown in step 68. In a preferred embodiment of the present invention, the quantity relating to the amount of filtering performed is based on at least one of: the flow of slurry into the filtration process, the flow of liquid component from the filtration process, and the amount of solid component separated from the filtration process. A third signal is generated based on the output of the third sensor, as shown in step 70, and the values of the first signal, the second signal and the third signal are stored in a knowledge base, as shown in step 72.

Figure 5:
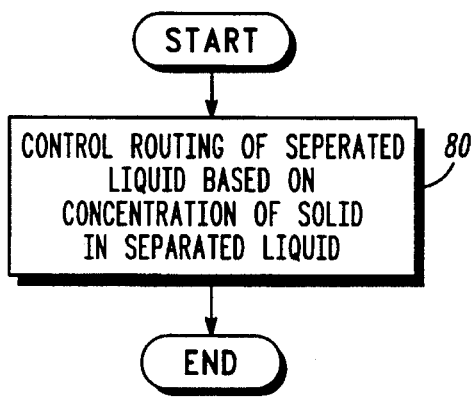
FIG. 5 shows a flowchart representation of a method for routing control used in conjunction with the method of FIG. 4 in one embodiment of the present invention.

FIG. 5 shows a flowchart representation of a method for routing control used in conjunction with the method of FIG. 4 in one embodiment of the present invention. The method comprises controlling the routing of the separated liquid component based on the stored value of the second signal in the knowledge base, as shown in step 80.

This routing could include several functions. If the level of solid in the separated liquid meets some threshold, such as a threshold set by governmental requirements, the separated liquid is routed to a first path. This first path results, for example, in safe disposal or recycling of the separated liquid. Alternatively, the first path could lead to reuse of the separated liquid in the source process. If the level of solids in the separated liquid do not meet the requirements (i.e. the level is too high), the separated liquid is routed back for further filtration.

Figure 6:
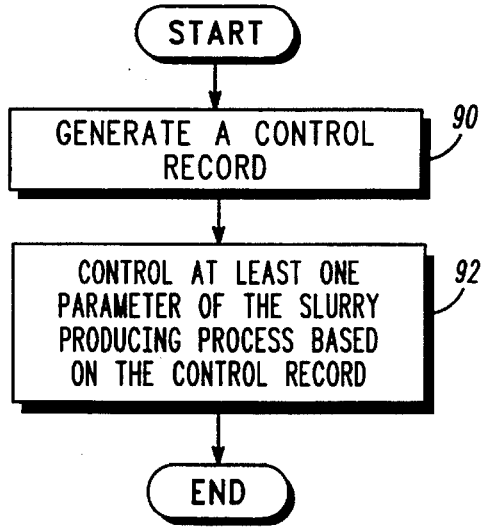
FIG. 6 shows a flowchart representation of a method used in conjunction with the method of FIG. 4 of one embodiment of the present invention.

FIG. 6 shows a flowchart representation of a method used in conjunction with the method of FIG. 4 of one embodiment of the present invention. The method includes generating a control record by comparing the stored value of the first signal to a control value, as shown in step 90. This step may include SPC charting techniques, quality assurance techniques or other process control methods for indicating an out-of-control condition in a process or for controlling the process itself. Thus, the method also optionally includes the step of controlling at lease one parameter of the slurry-producing process based on the control record, as shown in step 92.

It should be obvious to one of ordinary skill in the art that the methods and systems described herein and used in the various embodiments of the present invention are well suited for implementation on a processor such as a microprocessor, a digital signal processor or a microcontroller. Likewise these methods and systems could be implemented in hardware by a custom integrated circuit, ASIC, programmable logic array or other devices.

Thus there has been described herein a concept, as well as several embodiments including a preferred embodiment, of a method and system for monitoring and controlling a filtration process which include the formation of a filtration knowledge base, automated billing and automated compliance reporting.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a cross-flow filtration process receiving a slurry from a slurry-producing process having at least one parameter, the slurry having a liquid component and a solid component, the filtration process acting to separate the solid component of the slurry and the liquid component of the slurry, a method for creating a filtration knowledge base, the method comprising the steps of:

monitoring a concentration of the solid component in the slurry using a first sensor having an output;

generating a first signal based on the output of the first sensor;

monitoring a concentration of the solid component in the separated liquid component using a second sensor having an output;

generating a second signal based on the output of the second sensor;

monitoring a quantity relating to an amount of filtering performed using a third sensor;

generating a third signal based on the output of the third sensor;

storing values of the first signal, the second signal and the third signal in a knowledge base; and automatically routing the separated liquid component based on the stored value of the second signal in the knowledge base.

2. The method of claim 1 wherein the step of storing includes recording the values of the first signal, the second signal and the third signal at a plurality of discrete times.

3. The method of claim 1 wherein the quantity relating to the amount of filtering performed is based on at least one of: an amount of flow of slurry into the filtration process, an amount of flow of liquid component from the filtration process, and an amount of solid component separated from the filtration process.

4. The method of claim 1 further comprising the step of:

creating a record based on at one least value of the third signal stored in the knowledge base.

5. The method of claim 4 further comprising the step of:

transmitting the record to a station.

6. The method of claim 5 wherein the step of transmitting includes transmission of the record over a telephone line.

7. The method of claim 5 wherein the step of transmitting includes transmission of the record over an RF link.

8. The method of claim 1 further comprising the step of:

creating a compliance record by comparing the stored value of the second signal in the knowledge base to a compliance value.

9. The method of claim 8 further comprising the step of:

transmitting the compliance record to a central compliance station.

10. The method of claim 1 further comprising the step of:

generating a control record by comparing the stored value of the first signal to a control value.

11. The method of claim 10 further comprising the step of:

controlling at least one parameter of the slurry-producing process based on the control record.

12. The method of claim 1 wherein the step of routing includes routing the separated component for further filtration.

13. In a cross-flow filtration process receiving a slurry from a slurry-producing process having at least one parameter, the slurry having a liquid component and a solid component, the filtration process acting to separate the solid component of the slurry and the liquid component of the slurry, a system for filtering a slurry by cross-flow filtration while creating a filtration knowledge base, the system comprising:

means for separating a slurry by cross-flow filtration into a liquid component and a solid component;

a first sensor operable for monitoring a concentration of the solid component in the slurry and for generating a first signal based on the monitored concentration of the solid component in the slurry;

a second sensor operable for monitoring a concentration of the solid component in the separated liquid component and for generating a second signal based on the concentration of the solid component in the separated liquid component;

a third sensor operable for monitoring a quantity relating to an amount of filtering performed and for generating a third signal based on the monitored amount of filtering performed;

a knowledge base operable for storing values of the first signal, the second signal and the third signal; and a router, coupled to the knowledge base, operable to automatically route the separated liquid component in response to the stored value of the second signal in the knowledge base.

14. The system of claim 13 wherein the knowledge base records the values of the first signal, the second signal and the third signal at a plurality of discrete times.

15. The system of claim 13 wherein the quantity relating to the amount of filtering performed is based on at least one of: an amount of flow of slurry into the filtration process, an amount of flow of liquid component from the filtration process, and an amount of solid component separated from the filtration process.

16. The system of claim 13 further comprising:

means coupled to the knowledge base for creating a record based on at least one value of the third signal stored in the knowledge base.

17. The system of claim 16 wherein the means for creating a record further includes a transmitter for transmitting the record to a station.

18. The system of claim 17 wherein the transmitter transmits the record over a telephone line.

19. The system of claim 17 wherein the transmitter transmits the record over an RF link.

20. The system of claim 13 further comprising:

a compliance reporter, coupled to the knowledge base, for creating a compliance record based on a comparison of a stored value of the second signal in the knowledge base and a compliance value.

21. The system of claim 20 wherein the compliance reporter includes a transmitter for transmitting the compliance record to a central compliance station.

22. The system of claim 13 wherein the knowledge base includes means for generating a control record by comparing a stored value of the first signal to a control value.

23. The system of claim 22 further comprising:
a controller, coupled to the knowledge base, for controlling at least one parameter of the slurry-producing process based on the control record.

24. The system of claim 13 wherein the router routes the separated liquid for further filtration.

* * * * *